(12) United States Patent
Uno et al.

(10) Patent No.: US 8,921,485 B2
(45) Date of Patent: Dec. 30, 2014

(54) ADHESIVE COMPOSITION

(75) Inventors: Atsushi Uno, Takatsuki (JP); Yoshimi Shibata, Takatsuki (JP)

(73) Assignee: Sunstar Giken Kabushiki Kaisha, Osaka (JP)

( * ) Notice: Subject to any disclaimer, the term of this patent is extended or adjusted under 35 U.S.C. 154(b) by 574 days.

(21) Appl. No.: 12/735,080

(22) PCT Filed: Dec. 11, 2008

(86) PCT No.: PCT/JP2008/072503
§ 371 (c)(1),
(2), (4) Date: Jun. 14, 2010

(87) PCT Pub. No.: WO2009/078331
PCT Pub. Date: Jun. 25, 2009

(65) Prior Publication Data
US 2010/0280179 A1   Nov. 4, 2010

(30) Foreign Application Priority Data
Dec. 14, 2007 (JP) .................... 2007-322877

(51) Int. Cl.
| | | |
|---|---|---|
| C08L 53/00 | (2006.01) | |
| C09J 123/26 | (2006.01) | |
| C09J 151/06 | (2006.01) | |
| C09J 151/00 | (2006.01) | |
| C09J 153/02 | (2006.01) | |
| C08L 23/08 | (2006.01) | |
| C08L 51/06 | (2006.01) | |
| C08L 53/02 | (2006.01) | |

(52) U.S. Cl.
CPC .............. *C09J 151/06* (2013.01); *C09J 123/26* (2013.01); *C09J 151/006* (2013.01); *C09J 153/025* (2013.01); *C08L 23/0869* (2013.01); *C08L 51/06* (2013.01); *C08L 53/025* (2013.01)
USPC ........... 525/89; 525/254; 525/326.5; 525/342

(58) Field of Classification Search
CPC .... C09J 123/26; C09J 151/006; C09J 151/06; C09J 153/025; C08L 53/00; C08L 2666/04
USPC .................. 525/89, 254, 326.5, 342
See application file for complete search history.

(56) References Cited

U.S. PATENT DOCUMENTS

| | | | | |
|---|---|---|---|---|
| 3,868,433 A | * | 2/1975 | Bartz et al. ........................ | 525/78 |
| 4,578,429 A | * | 3/1986 | Gergen et al. .................. | 525/291 |
| 4,783,504 A | * | 11/1988 | St. Clair et al. .................. | 525/72 |
| 5,070,127 A | * | 12/1991 | Auerbach ...................... | 524/262 |
| 5,128,388 A | | 7/1992 | Komori et al. | |
| 5,227,213 A | | 7/1993 | Komori et al. | |
| 5,719,219 A | * | 2/1998 | Shah et al. .................... | 524/264 |
| 6,482,281 B1 | * | 11/2002 | Schmidt ........................ | 156/108 |
| 2004/0059069 A1 | | 3/2004 | Grimm et al. | |
| 2004/0092663 A1 | * | 5/2004 | Krawinkel ...................... | 525/89 |
| 2004/0157977 A1 | * | 8/2004 | Kotsubo et al. ............... | 524/494 |
| 2004/0242775 A1 | | 12/2004 | Tahara et al. | |
| 2008/0125545 A1 | | 5/2008 | Tahara et al. | |

FOREIGN PATENT DOCUMENTS

| | | |
|---|---|---|
| JP | 48-39537 | 6/1973 |
| JP | 1-141969 | 6/1989 |
| JP | 06-033027 | 2/1994 |
| JP | 2000-034454 | 2/2000 |
| JP | 2000-512333 | 9/2000 |
| JP | 2000-303047 | 10/2000 |
| JP | 2002-527568 | 8/2002 |
| JP | 2007-023225 | 2/2007 |
| WO | WO 00/22062 | 4/2000 |
| WO | WO 03/020825 | 3/2003 |

OTHER PUBLICATIONS

Odian Principles of Polymerization, 4th Edition, New York, 2004.*

* cited by examiner

*Primary Examiner* — Mark Kaucher
(74) *Attorney, Agent, or Firm* — Jacobson Holman Hershkovitz PLLC

(57) ABSTRACT

The present invention relates to a moisture-curable adhesive composition applicable to production of automobile interior parts, having excellent adhesion to polyolefins such as polypropylene and polyethylene, and having excellent heat resistance. More specifically, the present invention relates to an adhesive composition comprising: a styrene block copolymer (A) having at least one unsaturated bond, a hydrogenated styrene block copolymer (B) having a styrene content of 15% by weight or more, a silane compound (C) having an unsaturated bond, an acid-modified polyolefin resin (D), and a polymerization initiator (E).

7 Claims, No Drawings

ADHESIVE COMPOSITION

TECHNICAL FIELD

The present patent application claims the priority benefit of Japanese Patent Application No. 2007-322877 (filing date: Dec. 14, 2007), the entirety of which is incorporated herein by reference.

The present invention relates to an adhesive composition, and more particularly to an adhesive composition having excellent heat resistance, which is especially useful for adhering materials containing polyolefins such as polypropylene and polyethylene.

BACKGROUND ART

Automobile interior parts (for example, roof linings, door trims, instrumental panels, dash silencers, center consoles, pillars, ornaments, rear parcels, and sheet covers) are generally obtained by adhering a cover material made of a polyolefin or a decorating material such as a fabric to a molded article made of a polyolefin such as polypropylene or polyethylene with an adhesive by a vacuum molding method, a pressure bonding method using a press, or the like. Chloroprene adhesives have hitherto been used for the adhesion. It is desired, however, to replace the chloroprene adhesives with adhesives containing no halogen, from the viewpoint of environmental safety.

As an alternative to the chloroprene adhesive, there are adhesives containing a styrene copolymer as a base polymer, but they are not suitable for use in adhering automobile interior parts because of their low heat resistance. In order to improve their heat resistance, silane-modification of a styrene copolymer has been performed (Patent Documents 1 and 2), but these adhesives do not have sufficient heat-resistant adhesion to polyolefins. In addition, when an olefin bonding agent is added thereto in order to improve the heat-resistant adhesion, there arises a problem of phase separation.

Patent Document 1: JP-A-2000-303047
Patent Document 2: JP-A-06-33027

DISCLOSURE OF THE INVENTION

Problem to be Solved by the Invention

The present invention provides a moisture-curable adhesive composition applicable to production of automobile interior parts, having excellent adhesion to polyolefins such as polypropylene and polyethylene, and having excellent heat resistance.

Means for Solving the Problem

The present inventors have found that an adhesive composition containing a styrene block copolymer (A) having at least one unsaturated bond as a base polymer, a silane compound (C) having an unsaturated bond, which is grafted onto the component (A), (E) a polymerization initiator, which is used in the graft reaction, an acid-modified polyolefin resin (D), which is a bonding agent particularly for the polyolefin, and a hydrogenated styrene block copolymer (B) having a styrene content of 15% by weight or more, which serves to prevent phase separation, can solve the problem described above, and have completed the present invention.

That is, the present invention includes the following:

[1] An adhesive composition containing:
  a styrene block copolymer (A) having at least one unsaturated bond,
  a hydrogenated styrene block copolymer (B) having a styrene content of 15% by weight or more,
  a silane compound (C) having an unsaturated bond,
  an acid-modified polyolefin resin (D), and
  a polymerization initiator (E);
[2] The adhesive composition according to [1], wherein at least a part of the silane compound (C) is grafted onto the styrene block copolymer (A);
[3] The adhesive composition according to [1] or [2], wherein the polymerization initiator (E) is a polymerization initiator generating radicals;
[4] The adhesive composition according to any one of [1] to [3], wherein the weight ratio of the styrene block copolymer (A) to the hydrogenated styrene block copolymer (B), (A)/(B), is from 100/10 to 100/100;
[5] The adhesive composition according to any one of [1] to [4], wherein the weight ratio of the styrene block copolymer (A) to the silane compound (C), (A)/(C), is from 100/1 to 100/50;
[6] The adhesive composition according to any one of [1] to [5], wherein the weight ratio of the styrene block copolymer (A) to the acid-modified polyolefin resin (D), (A)/(D), is from 100/10 to 100/100;
[7] The adhesive composition according to any one of [1] to [6], wherein the acid-modified polyolefin resin (D) has a weight average molecular weight of 10,000 or more; and
[8] The adhesive composition according to any one of [1] to [7], wherein the acid-modified polyolefin resin (D) has an acid modification amount of 0.5% by weight or more.

Effects of the Invention

The adhesive composition of the invention has excellent adhesion to polyolefins such as polypropylene and polyethylene and excellent heat resistance, and therefore, it is particularly useful for adhering polyolefin molded articles to polyolefin cover materials in production of automobile interior parts.

BEST MODE FOR CARRYING OUT THE INVENTION

The adhesive composition of the invention contains a styrene block copolymer (A) having at least one unsaturated bond as a base polymer.

Examples of the styrene block copolymer (A) include copolymers represented by the general formula: A-B-A or A-B wherein A represents a polystyrene part, and B represents a diene polymer, and more specific examples thereof include a styrene-butadiene-styrene block copolymer (SBS), styrene-hexadiene-styrene, and styrene-pentadiene-styrene. Polyolefins modified with a compound having an unsaturated bond may also be used as B, and examples thereof include acrylic acid-modified polyolefins and maleic acid-modified polyolefins. They may be used alone or as a mixture of two or more kinds thereof.

As the styrene block copolymer (A), a styrene-butadiene-styrene block copolymer (SBS) is preferable from the viewpoints of adhesion to an adherend having low polarity such as polyolefin resins and reactivity with the silane compound (C) having an unsaturated bond.

The adhesive composition of the invention contains the hydrogenated styrene block copolymer (B) having a styrene content of 15% by weight or more as a compatibilizing agent for the styrene block copolymer (A) and the acid-modified polyolefin resin (D) to be described later.

Examples of the hydrogenated styrene block copolymer (B) include a styrene-ethylene-butene-styrene block copolymer (SEBS), a styrene-ethylene-propylene-styrene block polymer, a hydrogenated product of a styrene-butadiene-styrene block copolymer (SBS), and a hydrogenated product of a styrene-isoprene-styrene block copolymer (SIS). In addition, styrene copolymers modified with maleic anhydride or acrylic acid can also be mentioned. They may be used alone, or as a mixture of two or more kinds thereof.

The hydrogenated styrene block copolymer (B) has a styrene content (the content of the polystyrene part) of 15% by weight or more, more preferably 30% by weight or more. When the styrene content is less than 15% by weight, the effect as a compatibilizing agent for the styrene block copolymer (A) and the acid-modified polyolefin resin (D) is insufficient. On the other hand, the upper limit of the styrene content is not particularly limited, but when the content is too high, the adhesion of the adhesive to the polyolefin decreases and the flexibility of the cured adhesive is impaired, thus resulting in easy occurrence of interfacial failure caused by the polyolefin. From this viewpoint, the content is preferably 70% by weight or less, more preferably 50% by weight or less.

Here, the term "styrene content" means a value determined according to the blending ratio upon polymerization.

As the hydrogenated styrene block copolymer (B), a styrene-ethylene-butene-styrene block copolymer (SEBS) is preferable from the viewpoint of the effect as the compatibilizing agent for the styrene block copolymer (A) and the acid-modified polyolefin resin (D).

In the adhesive composition of the invention, the weight ratio of the styrene block copolymer (A) to the hydrogenated styrene block copolymer (B), (A)/(B), is preferably from 100/10 to 100/100, more preferably from 100/30 to 100/80. When the amount of the hydrogenated styrene block copolymer (B) is less than 10 parts by weight based on 100 parts by weight of the styrene block copolymer (A), the compatibility of the acid-modified polyolefin resin (D) decreases, and separation may easily occur. On the other hand, when the amount of the hydrogenated styrene block copolymer (B) is more than 100 parts by weight based on 100 parts by weight of the styrene block copolymer (A), the heat resistance of the adhesive composition may deteriorate.

The silane compound (C) having an unsaturated bond in the adhesive composition of the invention is used for providing moisture cross-linking groups to the styrene block copolymer (A). That is, the silane compound (C) is grafted onto the styrene block copolymer (A) by the action of the polymerization initiator (E) to be described later to form moisture cross-linking groups.

Examples of the silane compound (C) include vinyl silanes (for example, vinyltrimethoxysilane and vinyltriethoxysilane), styryl silanes (for example, p-styryltrimethoxysilane), methacryloxysilanes (for example, 3-methacryloxypropylmethyldimethoxysilane, 3-methacryloxypropyltrimethoxysilane, 3-methacryloxypropylmethyldiethoxysilane, and 3-methacryloxypropyltriethoxysilane), and acryloxysilanes (for example, 3-acryloxypropyltrimethoxysilane). They may be used alone or as a mixture of two or more kinds thereof.

Methacryloxysilane is preferable as the silane compound (C) from the viewpoint of reactivity with the styrene block copolymer (A).

In the adhesive composition of the invention, the weight ratio of the styrene block copolymer (A) to the silane compound (C), (A)/(C), is preferably from 100/1 to 100/50, more preferably from 100/5 to 100/15. When the amount of the silane compound (C) is less than 1 part by weight based on 100 parts by weight the styrene block copolymer (A), the heat resistance of the adhesive composition of the invention may be insufficient. On the other hand, when the amount of the silane compound (C) is more than 50 parts by weight based on 100 parts by weight of the styrene block copolymer (A), a large amount of the silane compound (C) which has not reacted with the styrene block copolymer (A) remains in the adhesive composition, which may generate precipitates.

The acid-modified polyolefin resin (D) in the adhesive composition of the invention acts as a bonding agent for improving the bonding property of the adhesive composition of the invention to the polyolefin.

Examples of the acid-modified polyolefin resin (D) include acid-modified polypropylene, acid-modified polyethylene, acid-modified polybutene, acid-modified polypropylene-ethylene, acid-modified polypropylene-butene, acid-modified polyethylene-butene, and acid-modified polypropylene-ethylene-butene, and more specific examples thereof include maleic acid-modified polyolefin resins. They may be used alone or as a mixture of two or more kinds thereof.

The acid-modified polyolefin resin (D) has a weight average molecular weight of preferably 10,000 or more, more preferably 50,000 or more. When the weight average molecular weight is less than 10,000, the heat resistance of the adhesive of the invention may remarkably deteriorate. On the other hand, the upper limit of the weight average molecular weight is not particularly limited, but it is preferably 100,000 or less, more preferably 70,000 or less, from the viewpoint of the solubility in a solvent.

Here, the term "weight average molecular weight" means a value determined by a weight average molecular weight measurement of the acid-modified polyolefin resin (D) according to a liquid chromatograph.

The acid-modified polyolefin resin (D) has an acid modification amount of preferably 0.5% by weight or more, more preferably 1.0% by weight or more. When the acid modification amount of the acid-modified polyolefin resin (D) is less than 0.5% by weight, the solubility and the compatibility with other resins may deteriorate. On the other hand, the upper limit of the acid modification amount is not particularly limited, but it is preferably 5.0% by weight or less, more preferably 3.5% by weight or less, from the viewpoint of adhesion of the adhesive composition to an adherend having low polarity such as polyolefin resins.

Here, the term "acid modification amount" means a value determined depending on the blending amount of the acid-modified polyolefin resin (D) upon production.

In the adhesive composition of the invention, the weight ratio of the styrene block copolymer (A) to the acid-modified polyolefin resin (D), (A)/(D), is preferably from 100/10 to 100/100, more preferably from 100/25 to 100/50. When the amount of the acid-modified polyolefin resin (D) is less than 10 parts by weight based on 100 parts by weight of the styrene block copolymer (A), the adhesion of the adhesive composition of the invention to the polyolefin such as polypropylene may be insufficient. On the other hand, when the amount of the acid-modified polyolefin resin (D) is more than 100 parts by weight based on 100 parts by weight of the styrene block copolymer (A), the heat resistance of the adhesive composition of the invention may deteriorate.

The polymerization initiator (E) in the adhesive composition of the invention is used for grafting the silane compound (C) onto the styrene block copolymer (A).

Examples of the polymerization initiator (E) include compounds capable of generating radicals by heating, and specific examples thereof include peroxides such as hydroperoxide, dialkyl peroxide, benzoyl peroxide, peroxyketal and peroxyketal; and azo initiators such as 2,2-azobisisobutyronitrile. These may be used alone or as a mixture of two or more kinds thereof.

The polymerization initiator (E) preferably has a half life at 60 to 100° C. from the viewpoints of polymerizability and safety in handling.

In the adhesive composition of the invention, the weight ratio of the styrene block copolymer (A) to the polymerization initiator (E), (A)/(E), is preferably from 100/0.05 to 100/10, more preferably from 100/0.1 to 100/5. When the amount of the polymerization initiator (E) is less than 0.05 part by weight based on 100 parts by weight of the styrene block copolymer (A), the silane compound (C) does not polymerize and are not grafted onto the styrene block copolymer (A), and thus the moisture curability of the adhesive composition may be impaired. On the other hand, when the amount of the polymerization initiator (E) is more than 10 parts by weight based on 100 parts by weight of the styrene block copolymer (A), the reaction excessively proceeds upon synthesis and the molecular weight of the styrene block copolymer (A) becomes high, thus resulting in decrease of the solubility in a solvent.

In the adhesive composition of the invention, it is preferable that at least a part of the silane compound (C), for example, 5 to 100% by weight, preferably 20 to 100% by weight of the whole silane compound (C) is previously grafted onto the styrene block copolymer (A). The moisture curability can be realized and the heat resistance can be provided by grafting the silane compound (C). In this case, the adhesive composition is advantageous also from the viewpoint of cost.

The silane compound (C) can be grafted onto the styrene block copolymer (A) by, for example, stirring the composition while heating (for example, at 60 to 90° C. for 60 to 360 minutes) using the polymerization initiator (E).

The adhesive composition of the invention may contain, in addition to the components described above, various additives such as a solvent, a pressure-sensitive adhesive, a tackifying resin, an anti-aging agent, a dehydrating agent and a coloring agent, if necessary.

The adhesive composition of the invention may be produced by adding sequentially the components (A) to (E) and other additives according to an ordinary method and stirring the mixture.

The adhesive composition of the invention can be usually applied to an adherend by a usual method (for example, a spraying method), dried (usually at room temperature to 120° C. for several seconds to 10 minutes), and cured with moisture in the air (usually at 5 to 100% RH (relative humidity) at −10 to 100° C. for 2 to 48 hours). Examples of the adherend to which the adhesive composition of the invention is applied include, particularly, materials made of a polyolefin such as polypropylene or polyethylene. The composition may also be applied to an adherend made of a material other than the polyolefin, such as urethane, nylon, a fabric, an ABS resin, or PVC.

As the adhesive composition of the invention has excellent adhesion particularly to polyolefins and has excellent heat resistance, it is particularly suitable for use in adhering polyolefin molded articles to polyolefin cover materials through a vacuum molding method, a pressure bonding method, or the like, in production of automobile interior parts such as roof linings, door trims, instrumental panels, dash silencers, center consoles, pillars, ornaments, rear parcels, and sheet covers.

EXAMPLES

Next, the present invention will be described in more detail by way of examples and comparative examples. Evaluation items and methods of the adhesive compositions of examples and comparative examples are shown in the following.
[Evaluation Items and Evaluation Methods]
[Compatibility]
Components of the adhesive composition were blended and the mixture was allowed to stand at 40° C. for 10 days. After that, the state of the solution was visually confirmed.
[Adhesion]
(1) Peeling Off at Ordinary State
An adherend and a cover material were laminated together by applying and drying an adhesive composition under the following conditions and the resulting product was aged at 20° C. under 65% RH (relative humidity) for 24 hours. After that, the peeling state was confirmed and evaluated according to the following criteria.
FMB: Material failure of the cover material
FAF: Interfacial failure from the cover material side
(2) Heat-Resistant Creep
An adherend and a cover material were laminated together by applying and drying an adhesive composition under the following conditions and the resulting product was aged at 20° C. under 65% RH (relative humidity) for 24 hours. The product was allowed to stand at 80° C. for 24 hours (load: 100 g) and after that the length (mm) of peeling was measured.
(Lamination Conditions)
Adherends PP (polypropylene)×PPF (PP containing filler)
Amount of adhesive composition applied: 200 g/m²
Drying: 80° C.×2 minutes
Heating condition of cover material (PPF): 120° C.×1 minute
Compression: 0.05 MPa×15 seconds Examples 1 to 4 and Comparative Examples 1 to 5

Components (parts by weight) shown in Table 1 were blended to produce adhesive compositions. With respect to each of the resulting adhesive compositions, evaluations were performed as described above. The results are shown in Table 1.

TABLE 1

|  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| (A) D-1101 | 100 | 100 | 100 | 100 |  | 100 | 100 | 100 | 100 |
| (B) S-8007 | 40 | 40 | 80 | 40 | 140 | 40 |  |  | 40 |
| (B') H-1221 |  |  |  |  |  |  |  | 40 |  |
| (D) acid-modified polypropylene | 47 | 28.2 | 47 | 47 | 47 | 47 | 47 | 47 |  |
| (E) Nyper FF | 0.75 | 0.75 | 0.75 | 0.75 | 0.75 |  | 0.75 | 0.75 | 0.75 |
| (C) KBM-503 | 6.56 | 6.56 | 6.56 | 13.12 | 6.56 | 6.56 | 6.56 | 6.56 | 6.56 |

TABLE 1-continued

| | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| petroleum pressure-sensitive adhesive | 250 | 250 | 250 | 250 | 250 | 250 | 250 | 250 | 250 |
| toluene | 1300 | 1300 | 1300 | 1300 | 1300 | 1300 | 1300 | 1300 | 1300 |
| compatibility | no separation/ gelation | no separation/ gelation | no separation/ gelation | no separation/ gelation | no separation/ gelation | no separation/ gelation | no separation/ phase separation | phase separation | no separation/ gelation |
| peeling off at ordinary state | FMB | FMB | FMB | FMB | FMB | FMB | — | — | FAF |
| heat-resistant creep (mm) | 0 | 0 | 0 | 0 | fell | fell | — | — | 20 |

FMB: material failure of the cover material
FAF: interfacial failure from the cover material side
(A) D-1101: SBS (manufactured by Kraton Polymers Japan Co., Ltd.)
(B) S-8007: SEBS (styrene content: 30% by weight; manufactured by Kuraray Co., Ltd.)
(B') H-1221: SEBS (styrene content: 12% by weight; manufactured by Asahi Kasei Chemicals Corporation)
(D) acid-modified polypropylene: maleic anhydride-modified olefin resin (weight average molecular weight: 60,000, acid modification amount: 1.0% by weight; manufactured by Toyo Kasei Kogyo Co., Ltd.)
(E) Nyper FF: benzoyl peroxide (manufactured by NOF Corporation)
(C) KBM-503: 3-methacryloxypropyltrimethoxysilane (manufactured by Shin-Etsu Chemical Co., Ltd.)
petroleum pressure-sensitive adhesive: saturated alicyclic hydrocarbon resin (manufactured by Arakawa Chemical Industries, Ltd.)

As shown in Table 1, it is apparent that the adhesive compositions of examples have excellent adhesion both at room temperature and on heating.

The invention claimed is:

1. A moisture curable adhesive composition comprising:
a non-hydrogenated styrene block copolymer (A) having at least one unsaturated bond,
a hydrogenated styrene block copolymer (B) having a styrene content of 15% by weight or more,
a silane compound (C) having an unsaturated bond,
an acid-modified polyolefin resin (D), and optionally
a polymerization initiator (E),
wherein 5 to 100% by weight of the silane compound (C) is grafted onto the non-hydrogenated styrene block copolymer (A), and wherein the weight ratio of the styrene block copolymer (A) to the hydrogenated styrene block copolymer B, (A/(B), is from 100/10 to 100/100.

2. The adhesive composition according to claim 1, wherein the polymerization initiator (E) is a polymerization initiator generating radicals.

3. The adhesive composition according to claim 1, wherein the weight ratio of the non-hydrogenated styrene block copolymer to (A) the silane compound (C), (A)/(C), is from 100/1 to 100/50.

4. The adhesive composition according to claim 1, wherein the weight ratio of the styrene block copolymer (A) to the acid-modified polyolefin resin (D), (A)/(D), is from 100/10 to 100/100.

5. The adhesive composition according to claim 1, wherein the acid-modified polyolefin resin (D) has a weight average molecular weight of 10,000 or more.

6. The adhesive composition according to claim 1, wherein the acid-modified polyolefin resin (D) has an acid modification amount of 0.5% by weight or more.

7. The adhesive composition according to claim 1, wherein the silane compound (C) is selected from the group consisting of a vinyl silane, styryl silane, methacryloxysilane, acryloxysilane, and mixtures thereof.

* * * * *